United States Patent
Wang

(10) Patent No.: US 11,169,962 B2
(45) Date of Patent: Nov. 9, 2021

(54) FILE MANAGEMENT SYSTEM, FILE MANAGEMENT METHOD, COLLECTION PROGRAM, AND NON-TRANSITORY COMPUTER-READABLE INFORMATION RECORDING MEDIUM

(71) Applicant: Rakuten Group, Inc., Tokyo (JP)

(72) Inventor: Yongkun Wang, Tokyo (CN)

(73) Assignee: Rakuten Group, Inc., Tokyo (JP)

( * ) Notice: Subject to any disclaimer, the term of this patent is extended or adjusted under 35 U.S.C. 154(b) by 526 days.

(21) Appl. No.: 16/085,435

(22) PCT Filed: Mar. 17, 2016

(86) PCT No.: PCT/JP2016/058527
§ 371 (c)(1),
(2) Date: Sep. 14, 2018

(87) PCT Pub. No.: WO2017/158794
PCT Pub. Date: Sep. 21, 2017

(65) Prior Publication Data
US 2019/0114286 A1    Apr. 18, 2019

(51) Int. Cl.
*G06F 16/11* (2019.01)
*G06F 12/00* (2006.01)
*G06F 16/17* (2019.01)
*G06F 7/58* (2006.01)
*G06F 17/10* (2006.01)

(52) U.S. Cl.
CPC ........... *G06F 16/122* (2019.01); *G06F 7/588* (2013.01); *G06F 12/00* (2013.01); *G06F 16/1734* (2019.01); *G06F 17/10* (2013.01)

(58) Field of Classification Search
CPC .... G06F 16/122; G06F 16/1734; G06F 12/00; G06F 7/588; G06F 17/10
See application file for complete search history.

(56) References Cited

U.S. PATENT DOCUMENTS 5,720,026 A * 2/1998 Uemura ............... G06F 11/1451
714/6.3
5,926,821 A * 7/1999 Hirose ................... G06F 3/0619
(Continued)

FOREIGN PATENT DOCUMENTS

JP         2014-81898 A    5/2014

*Primary Examiner* — Robert W Beausoliel, Jr.
*Assistant Examiner* — Susan F Rayyan
(74) *Attorney, Agent, or Firm* — Sughrue Mion, PLLC

(57) ABSTRACT

In a server (111), an updater (201) updates a file by an editing process that includes an adding process that adds a record to the end of a file. A collector (202) reads, in order of location in the file, a record included in the file, causes a collection device of a collection system to associate and collect the record and a position of the record in the file, and non-transitorily stores the position as an offset. An estimator (203) estimates whether header records located between the beginning of the file and the recorded offset are updated. When it is estimated that any of the header records are updated, a starter (204) causes the collector (202) to start reading the record from the beginning of the file. When it is estimated that none of the header records have been updated, the starter 204 causes the collector (202 to start reading the record from the recorded offset.

11 Claims, 5 Drawing Sheets

(56) References Cited

U.S. PATENT DOCUMENTS

| | | | | |
|---|---|---|---|---|
| 6,009,502 A * | | 12/1999 | Boeuf | G06F 11/1435 707/999.202 |
| 6,339,795 B1 * | | 1/2002 | Narurkar | G06F 16/258 709/246 |
| 6,604,236 B1 * | | 8/2003 | Draper | G06F 8/66 717/170 |
| 7,277,905 B2 | | 10/2007 | Randal | G06F 16/221 707/648 |
| 7,890,469 B1 * | | 2/2011 | Maionchi | G06F 16/10 707/654 |
| 8,032,009 B2 | | 10/2011 | Furuta | G11B 27/034 386/279 |
| 8,135,676 B1 * | | 3/2012 | Poojary | G06F 11/1451 707/646 |
| 8,601,225 B2 * | | 12/2013 | Atluri | G06F 11/1456 711/162 |
| 8,666,944 B2 * | | 3/2014 | Beatty | G06F 11/1469 707/679 |
| 8,694,458 B2 * | | 4/2014 | Kim | G06N 20/00 706/46 |
| 9,020,987 B1 * | | 4/2015 | Nanda | G06F 16/1734 707/821 |
| 9,171,002 B1 * | | 10/2015 | Mam | G06F 3/0679 |
| 9,201,906 B2 * | | 12/2015 | Kumarasamy | G06F 3/067 |
| 9,251,186 B2 * | | 2/2016 | Muller | G06F 16/185 |
| 9,286,165 B2 * | | 3/2016 | Hwang | G06F 11/1435 |
| 9,311,333 B1 * | | 4/2016 | Pawar | G06F 16/1865 |
| 9,442,955 B1 * | | 9/2016 | Pawar | G06F 17/00 |
| 9,449,007 B1 * | | 9/2016 | Wood | G06F 21/6227 |
| 9,460,177 B1 * | | 10/2016 | Pawar | G06F 16/1865 |
| 9,633,022 B2 * | | 4/2017 | Vijayan | G06F 11/1451 |
| 9,785,510 B1 * | | 10/2017 | Madhavarapu | G06F 3/065 |
| 10,250,446 B2 * | | 4/2019 | Prasad | H04L 41/046 |
| 10,380,141 B1 * | | 8/2019 | Chepel | G06F 11/1471 |
| 10,514,985 B1 * | | 12/2019 | Patwardhan | G06F 11/1451 |
| 10,567,500 B1 * | | 2/2020 | Leshinsky | H04L 67/1076 |
| 10,776,209 B2 * | | 9/2020 | Pawar | G06F 11/2094 |
| 2008/0215834 A1 * | | 9/2008 | Dumitru | G06F 3/0674 711/161 |
| 2012/0246125 A1 * | | 9/2012 | Kato | G06F 16/10 707/692 |
| 2016/0210194 A1 * | | 7/2016 | Kumarasamy | G06F 3/0619 |
| 2018/0165345 A1 * | | 6/2018 | Nomura | G06F 11/1453 |

* cited by examiner

FILE MANAGEMENT SYSTEM, FILE MANAGEMENT METHOD, COLLECTION PROGRAM, AND NON-TRANSITORY COMPUTER-READABLE INFORMATION RECORDING MEDIUM

CROSS REFERENCE TO RELATED APPLICATIONS

This application is a National Stage of International Application No. PCT/JP2016/058527 filed Mar. 17, 2016, the disclosure of which is incorporated herein in its entirety by reference.

TECHNICAL FIELD

The present disclosure relates to a file management system, a file management method, a collection program, and a non-transitory computer-readable information recording medium.

BACKGROUND ART

In the related art, technologies for copying a plurality of records included in a file from one computer to another computer are widely used. For example, Patent Literature 1 proposes a divided file backup system that enables saving while maintaining redundancy. In this system, the data of a file is divided into a plurality of records and the various records are distributed to a plurality of mobile terminals.

In web servers, for example, an editing process that adds a record to the end of a file is frequently performed to record accesses to the web server in a log file. In many server devices, when various events occur, an editing process is executed that adds a record expressing the details of that event to the end of the log file.

It is rare that a log file is subjected to an editing process that replaces, deletes, or inserts a record in the middle of the log file. That is, in cases such as when the log file has become large, typically, the log file to be subjected to the editing process is cleared by performing a process that deletes or renames the log file and, thereafter, an adding process is performed.

In the information processing in a personal computer, an adding process that adds a record to the end of the file is executed more frequently than other types of editing processes.

The simplest method for matching the content of the plurality of records included in such a file between one computer and another computer includes detecting that an editing process has been performed on the file by monitoring the update timestamp of the file, and then copying the entire file that was subjected to the editing process.

CITATION LIST

Patent Literature

Patent Literature 1: Unexamined Japanese Patent Application Kokai Publication No. 2014-81898

SUMMARY OF INVENTION

Technical Problem

However, when a file is frequently updated as described above, situations may occur in which a record is added to the end of a file during the period from when the copying of the entire file is started to when the copying is completed. In such situations, the update timestamp of the file changes, making it necessary to re-copy the file from the beginning. Accordingly, with the method of copying the entire file, there are many cases in which, in practice, it is difficult to match the content of the plurality of records included in the file between computers.

In situations in which the power of the server device that manages the original file is turned off due to maintenance or the like, or when the operating system or a program of the server device is being updated, the program for matching the plurality of records included in the file between computers is temporarily ended. Consequently, the program must be re-executed when the computer, the operating system, or the like is restarted. As such, when re-executing the program, it is desirable that the initialization of the program is completed as quickly as possible so that the process that matches the plurality of records included in the file between computers can be resumed.

In light of these problems, an objective of the present disclosure is to provide a file management system in which a server device, which performs an adding process that adds a record to an end of a file, causes a collection device to collect the records included in the file. Such a file management system is suited to suppress the calculation load of the server device and the communication load between the server device and the collection device. The objective of the present disclosure further includes providing a file management method, a collection program for realizing the server device using a computer, and a non-transitory computer-readable information recording medium on which the collection program is recorded.

Solution to Problem

The file management system of the present disclosure includes a server device that non-transitorily stores a file and an offset for the file, and a collection system. In this file management system, (a) the server device executes an editing program, thereby updating the file by an editing process that includes an adding process that adds a record to an end of the file;

(b) the server device executes a collection program, thereby reading, in order of location in the file, a record included in the file, causing the collection system to associate and collect the read record and a position where a beginning of the read record is located in the file, and updating the non-transitorily stored offset to a position where an end of the collected record is located in the file; and (c) when the execution of the collection program is started, the server device estimates whether any header records located between the beginning of the file and the non-transitorily stored offset are updated and, when it is estimated that any of the header records are updated, starts reading the record of the file from the beginning of the file, and when it is estimated that none of the header records are updated, starts reading the record of the file from the non-transitorily stored offset.

Advantageous Effects of Invention

According to the present disclosure, a file management system can be provided in which a server device, which performs an adding process that adds a record to an end of a file, causes a collection device to collect the records included in the file. This file management system is suited to suppress the calculation load of the server device and the communication load between the server device and the collection device. Additionally, a file management method, a collection program for realizing the server device using a computer, and a non-transitory computer-readable information recording medium on which the collection program is recorded can be provided.

DESCRIPTION OF EMBODIMENTS

Hereinafter, embodiments of the present disclosure are described. However, the following embodiments are presented for the purpose of explanation and should not be construed as limiting the scope of the invention of the present disclosure. Therefore, embodiments in which some elements or all elements of these embodiments are replaced with equivalent elements by one skilled in the art can also be employed, and such embodiments are also included within the scope of the present disclosure.

Embodiment 1

Figure 1:
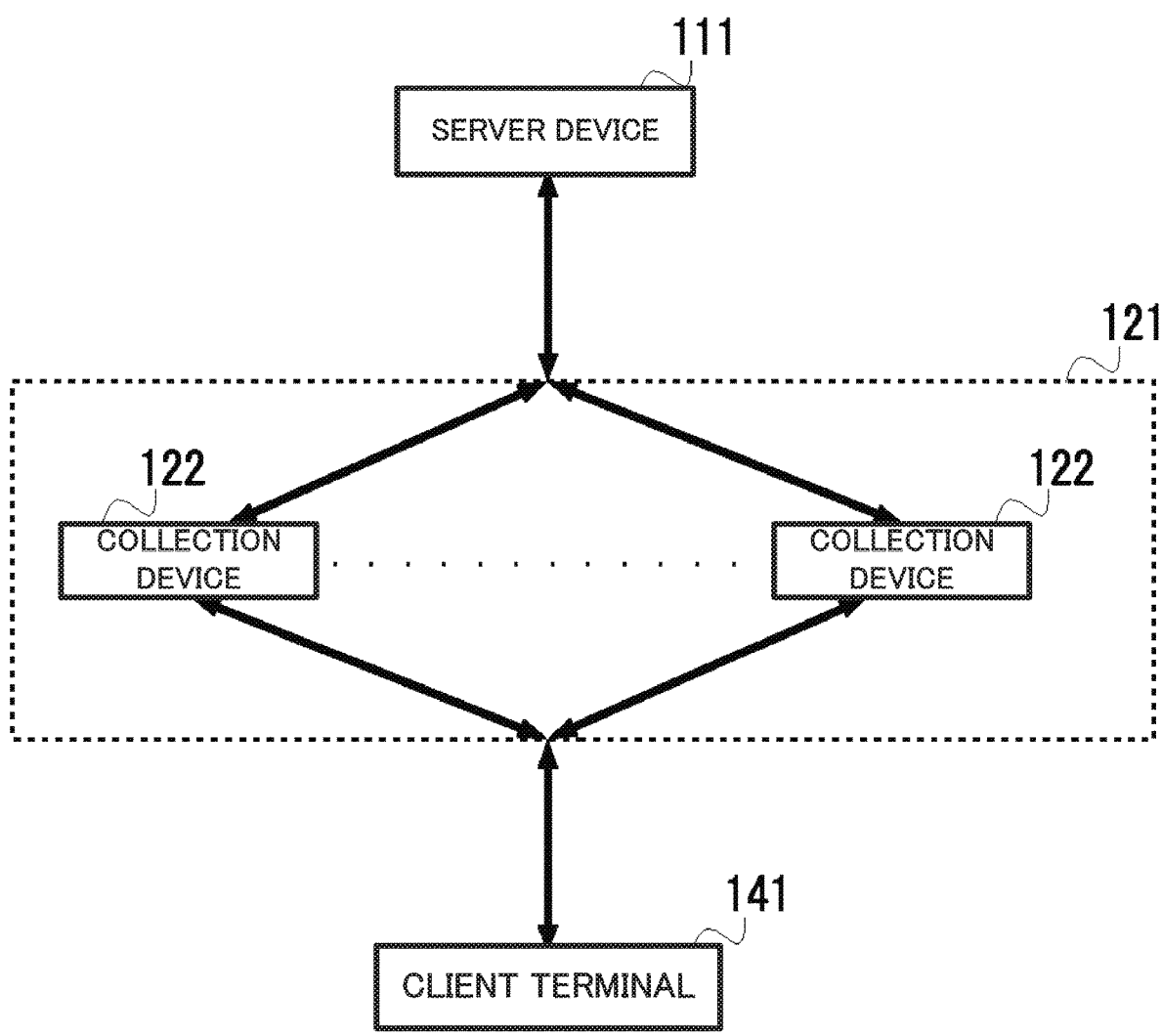
FIG. 1 is an explanatory drawing illustrating the configuration of a file management system according to an embodiment of the present disclosure.

FIG. 1 is an explanatory drawing illustrating the configuration of a file management system according to an embodiment of the present disclosure. Hereinafter, the file management system is described while referencing FIG. 1.

The file management system 101 according to the present embodiment includes a server device 111 and a collection system 121. The file management system can also include a client terminal 141 as an optional element.

The server device 111 is a computer on which a file updating (editing) process is performed. In one example, when the server device 111 functions as a web server, each time an access event to the web server occurs, the server device 111 executes an adding process that adds a record representing that event to the end of a log file.

When performing an access analysis on the basis of the log file, the file management system 101 causes the collection system 121 to collect the various records included in the log file in order to prevent declines in the performance of the web server functions of the server device 111.

The collection system 121 includes one or more collection devices 122. Each of the collection devices 122 executes a collection process on the basis of a command from the server device 111. The collection process is a process that receives and saves the various records included in the file managed on the server device 111.

The client terminal 141 is actually responsible for the web server access analysis. That is, when a query is sent from the client terminal 141 to the collection system 121, the collection system 121 responds with the records that satisfy that query.

Computers that are prepared for each purpose execute programs for each purpose to realize the server device 111, the collection device 122, and the client terminal 141.

These programs can be distributed from a distribution server (not illustrated in the drawings) via a transitory transmission medium such as a computer communication network. Here, the distribution server is managed by the operator of the file management system 101. For example, the programs can be distributed using the web server function of the server device 111.

Additionally, these programs can be recorded on a non-transitory computer-readable information recording medium such as a compact disk, a flexible disk, a hard disk, a magneto-optical disk, a digital video disk, a magnetic tape, read-only memory (ROM), electrically erasable programmable ROM (EEPROM), flash memory, and semiconductor memory. This information recording medium can be distributed and sold independent from the various computers.

The distributed programs are recorded on a non-transitory information recording medium such as flash memory or a hard disk of the downloading computer.

The central processing unit (CPU) of the computer reads the non-transitorily stored programs to random access memory (RAM), and then executes the commands in the programs. Note that the RAM is a temporary storage device.

However, in architectures in which the read-only memory (ROM) and the RAM can be mapped to a single memory space and the commands in the programs can be executed, the commands in the programs stored in the ROM are read and executed directly by the CPU.

Note that a configuration is possible in which dedicated electronic circuits are used instead of computers to realize the various devices of the present embodiment. In this case, the programs function as materials for generating timing charts, wiring diagrams, and the like of the electronic circuits. Moreover, in such a case, the electronic circuits that satisfy the specifications stipulated by the programs are configured from field programmable gate arrays (FPGA), application specific integrated circuits (ASIC), or the like. The electronic circuits function as dedicated devices that fulfill the functions stipulated by the programs.

Figure 2:
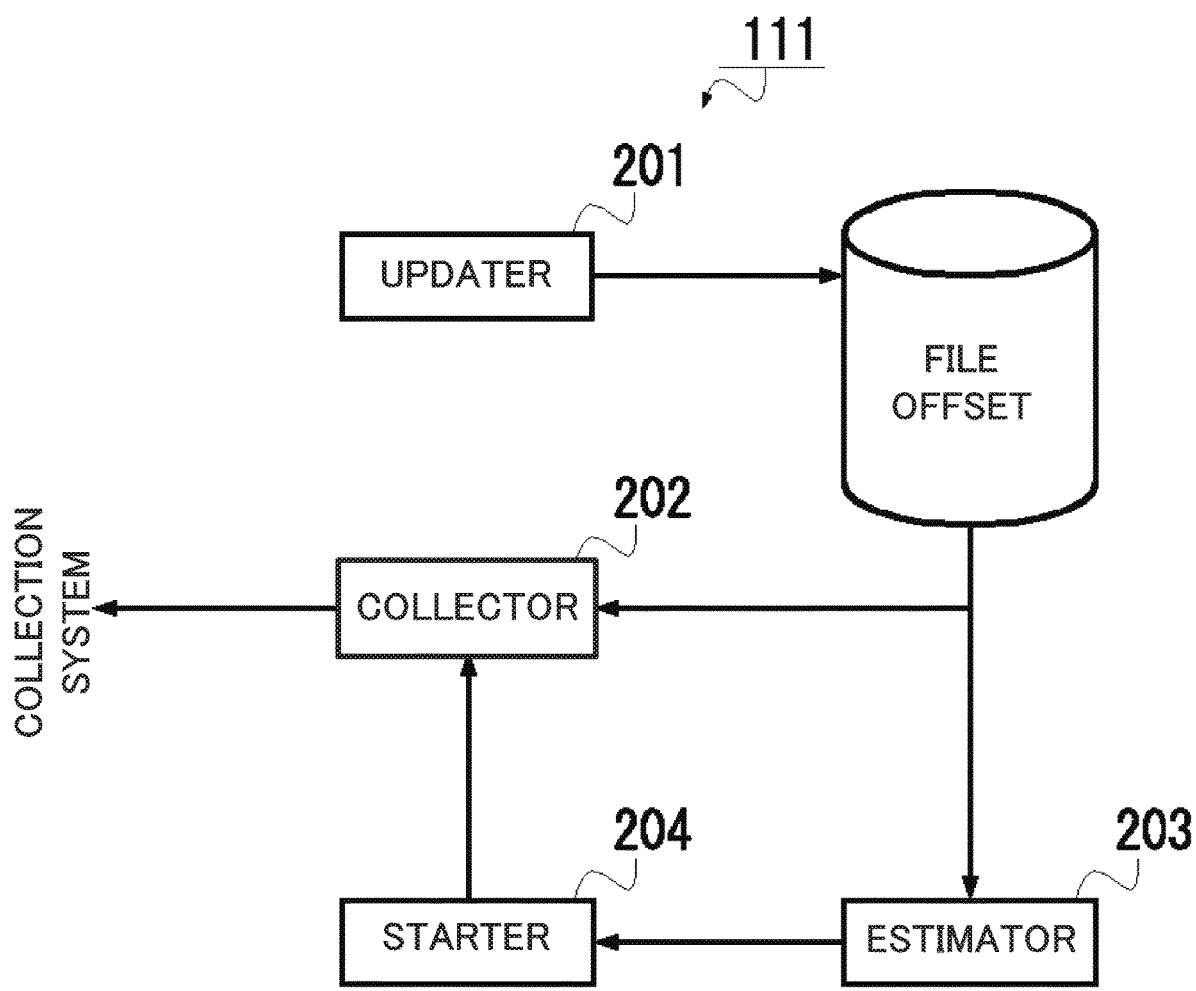
FIG. 2 is an explanatory drawing illustrating the configuration of a server device of the file management system according to an embodiment of the present disclosure.

FIG. 2 is an explanatory drawing illustrating the configuration of the server device of the file management system according to an embodiment of the present disclosure. Hereinafter, the server device is described while referencing FIG. 2.

As illustrated in FIG. 2, the server device 111 includes an updater 201, a collector 202, an estimator 203, and a starter 204. The computer for realizing the server device 111 executes an editing program to realize the updater 201, and executes a collection program to realize the collector 202, the estimator 203, and the starter 204.

The updater 201 updates the file by an editing process that includes the adding process that adds a record to the end of the file.

The file to be subjected to the editing process is saved on a hard disk, flash memory, or the like of the server device 111, or on a non-transitory information recording medium such as network storage or the like that is connected to the server device 111.

For example, in a case in which the server device 111 provides a web service and the history of access to the server device 111 is recorded in a log file, records representing information related to each access are added to the end of the log file. Each of the records may have a fixed length (fixed number of bytes) or may have an arbitrary length (variable number of bytes). A line feed character attached to the end of each line may be used as a delimiter between each of the records.

The updater 201 executes an editing process in which updates to the file are exclusively appended to the end of the file. This editing process may be automatically executed by the server device 111 executing the editing program, or may be heteronomously executed in response to a command from a user.

The collector 202 reads a record, which is included in the file that is subjected to the editing process by the updater 201, in the order in which the record is located in the file, causes the collection system 121 to associate and collect the read record and the position where the beginning of the read record is located in the file, and updates a non-transitorily stored offset to the position where the end of the collected record is located in the file.

When the collector 202 executes this process for the first time, the records are read in order from the beginning of the file. Each time a record is read, the read record is copied to the collection system 121.

Note that, when the collector 202 causes the collection system 121 to collect a record, the position where the beginning of that record is located in the file is also recorded. Thus, even when each record is copied to one of the plurality of collection devices 122, it is possible to restore the original file by arranging and concatenating the records saved on the plurality of collection devices 122 in the order of the positions.

After the collector 202 has caused the collection system 121 to collect one record, the collector 202 records, on the non-transitory information recording medium, an offset indicating the point to which the reading of the records from the file has been completed or, in other words, an offset indicating the point to which the copying to the collection system 121 has been completed. When the records have a variable length, the offset is calculated in byte units, but when the record has a fixed length, the offset may be calculated in byte units or in record number units.

When a record is added to the file by the editing process while processing is progressing smoothly without the server device 111 breaking down or experiencing problems, the added record is read from the file by the collection process and the read file is copied to the collection system 121.

Accordingly, the original file can be restored by concatenating, in the collection system 121, the records collected by the collection system 121 in the order of the positions associated with the collected records. Alternatively, the original file can be restored by the client terminal 141 or the like acquiring the records collected by the collection system 121 and concatenating these records in the order of the positions associated with the collected records.

The reading of the record by the collector 202 may be performed by detecting that the record is added to the file. This detection may be performed by using a file update event detection function of the operating system (OS), updating a flag for calling the collection process in the editing process of the file, or issuing a signal or notification.

In addition, the collector 202 may intermittently (for example, when the server device 111 is idling or at low load; applies hereinafter) or periodically (for example, every day late at night or the like, or at a time frame when file updating frequency is expected to be low; applies hereinafter) monitor the size of the file for changes and, in cases in which there is no change, sleep for an appropriately determined amount of time and then repeat the same process and, in cases in which there is a change, determine that a record is added to the file and perform the reading.

However, in cases in which the server device 111 experiences some sort of breakdown or problem, various types of maintenance are performed, or there is a security update of the OS, the various applications/programs, or the library program, the editing program and the collection program must be ended and then restarted and/or the computer realizing the server device 111 must be rebooted.

When the collection program is restarted in this manner, the estimator 203 estimates whether any of the header records located between the beginning of the file and the non-transitorily stored offset are updated.

As described above, the header records located between the beginning of the file and the offset have already been copied to the collection system 121. Additionally, the editing process on the file mainly includes adding the record to the end of the file. Accordingly, provided that none of the header records are updated, re-copying to the collection system 121 is not necessary.

Meanwhile, it is necessary to compare the copied records on the server device 111 with the collection system 121 in order to thoroughly check whether any of the header records are updated. However, this manner of comparison requires a tremendous amount of communication time and calculation time.

As such, in the present embodiment, only an estimation as to whether any of the header records are updated is performed. As a result, the communication time and the calculation time can be reduced and the collection program can be quickly resumed. Note that estimation techniques are described later.

When it is estimated that any of the header records are updated, the starter 204 causes the collector 202 to start reading the record from the file from the beginning of the file. When it is estimated that none of the header records are updated, the starter 204 causes the collector 202 to start reading the record from the file from the non-transitorily stored offset. Thus, as described above, the collector 202 causes the collection system 121 to collect the read record in the read order together with the position where the record is located, and non-transitorily stores an offset indicating the position where the reading of the records ended.

Note that the estimator 203 may periodically or intermittently perform the estimation described above while the collection program is being executed, and not only at the start of the execution of the collection program. When, as a result of the estimation, it is estimated that any of the header records are updated, the collector 202 reads the record of the file again from the beginning of the file, and re-copies the record, from the beginning, to the collection system 121.

Estimation Techniques

Hereinafter, the various estimation techniques performed by the estimator 203 are described.

A first technique includes acquiring any of header records randomly or according to a predetermined rule and checking only the acquired record for changes.

Specifically, the collector 202 acquires an extraction position between the beginning of the file and the non-transitorily stored offset. This extraction position is referenced in the estimation by the estimator 203 (described later). As described above, the extraction position may be determined randomly, or may be acquired according to a predetermined rule.

One example of randomly determining the extraction position includes generating uniform random numbers from the beginning of the file to the offset, or generating random numbers of a probability distribution that attenuates from the offset toward the beginning of the file, and determining the extraction position using the random numbers. The latter is particularly preferable in situations in which there is likely to be conflict when writing to the end of the file. The attenuation may be exponential attenuation, linear attenuation, or reciprocal attenuation.

In a situation in which there is a possibility of a user manually editing the file, random numbers of a probability distribution that attenuates from the beginning of the file toward the offset may be generated, and the extraction position may be determined using the random numbers.

One example of determining the extraction position according to a predetermined rule includes multiplying the offset by a constant that is 0 or greater and less than 1 and setting the resulting integer as the extraction position.

Then, the collector 202 reads the data located at the extraction position acquired from the file, calculates a hash value of the read data, and records the acquired extraction position and the calculated hash value non-transitorily on a hard disk, flash disk, network storage connected to the server device 111, or the like.

The timings when the acquisition of the extraction position, the read of the data, the calculation of the hash value, and the non-transitory recording of the extraction position and the hash value are performed can be appropriately set according to the use or the like of the server device 111. Examples of timings that can be used include when a new record is added to the file, when the calculation load of the server device 111 is less than or equal to a threshold, and when a point in time set in a pre-planned schedule arrives.

When the collection program starts, the starter 204 acquires the non-transitorily stored extraction position, reads the data located at the extraction position acquired from the file, and calculates the hash value of the read data. Typically, the starter 204 issues commands to the estimator 203 to execute these processes.

If the update to the file is only a record addition, the hash value should match the non-transitorily stored hash value. Therefore, if the calculated hash value is equivalent to the non-transitorily stored hash value, the estimator 203 estimates that none of the header records are updated.

The second technique determines the extraction position according to the offset instead of randomly. Accordingly, the extraction position changes and the hash value is updated each time the offset is updated. Hereinafter, the second technique is described while focusing on the differences with the first technique.

Specifically, the collector 202 acquires an extraction position that is uniquely associated with the non-transitorily stored offset, reads the data located at the extraction position acquired from the file, calculates the hash value of the read data, and non-transitorily stores the calculated hash value.

Since the extraction position is uniquely determined according to the offset in this embodiment, the extraction position is not non-transitorily stored. Instead, it is preferable that the non-transitory recording of the offset and the calculation and non-transitory recording of the hash value are performed inseparably at substantially the same time. That is, it is preferable that the timings at which the acquisition of the extraction position, the calculation of the hash value, and the non-transitory recording of the extraction position and the hash value are performed are set to the timing at which the offset is non-transitorily stored.

When the collection program is started, as in the first technique, the starter 204 acquires the extraction position that is uniquely associated with the non-transitorily stored offset, reads the data located at the extraction position acquired from the file, and calculates the hash value of the read data. If the calculated hash value is equivalent to the non-transitorily stored hash value, the estimator 203 estimates that none of the header records are updated.

In the second technique, since the extraction position is uniquely determined from the offset, the extraction position is not non-transitory recorded. Aside from this point, the second technique includes the same processes as described for the first technique.

The third technique is the same as the second technique, with the exception that the extraction position is fixed at the first record, which is located at the beginning of the file. That is, when the collector 202 reads the first record located at the beginning of the file and the first record is collected by the collection system 121, the collector 202 calculates the hash value of the first record and non-transitorily stores the calculated hash value.

Meanwhile, the starter 204 calculates the hash value of the first record located at the beginning of the file. If the calculated hash value is equivalent to the non-transitorily stored hash value, the estimator 203 estimates that none of the header records are updated.

In these techniques, it is simplest when 1 is set as the number of records for which the hash value is to be calculated. However, from the perspectives of the sector size of the hard disk or the like and the buffer size of the file input/output, reading one record is substantially the same as reading a plurality of records. As such, all of the records read in one reading instance that are located before the offset may be referenced when calculating the hash value.

Operations of the Editing Program in the Server Device

Figure 3:
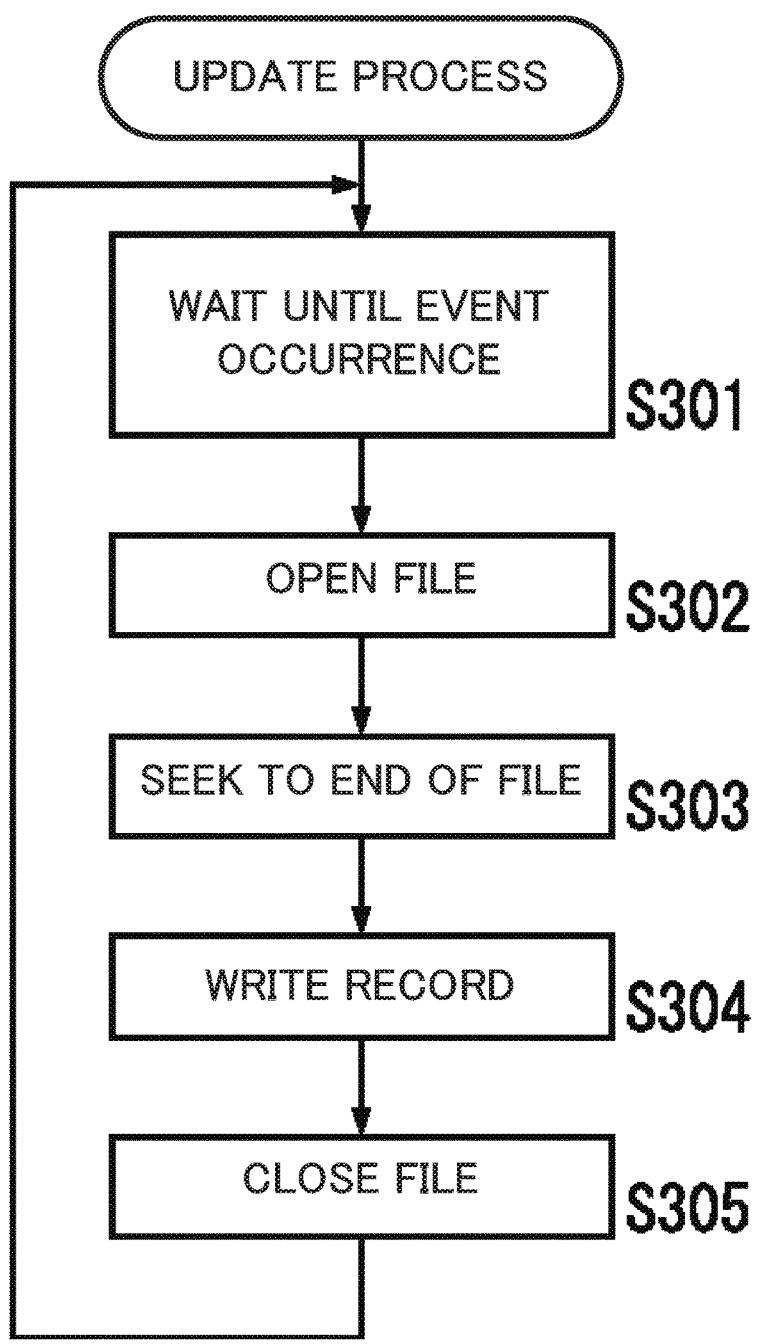
FIG. 3 is a flowchart illustrating the control of an update process executed by the server device according to an embodiment of the present disclosure.

Hereinafter, the flow of the control of the editing program, which is executed in the server device 111, is described. FIG. 3 is a flowchart illustrating the control of an update process executed by the server device according to an embodiment of the present disclosure. Hereinafter, the update process is described while referencing FIG. 3.

The editing program of the present embodiment performs a process that appends various events occurring on the server device 111 to the file. An example of such an event is a record of an access to the server device 111. That is, the server device 111 that has started the execution of the editing program waits until a monitoring target event occurs (step S301).

When an event occurs, the server device 111 opens the file (step S302), and seeks to the end (bottom) of the file (step S303).

Then, the server device 111 writes, to the file, a record expressing the details of the event (step S304), closes the file (step S305), and returns to the processing of step S301.

Records are appended to the end of the file by repeating these processes.

Note that, in the example described above, the file is opened and closed each time an event occurs. However, a configuration is possible in which the file is opened when the editing program is started and the file is left open. In this case, it is preferable that the writing of records to the file is appropriately flushed.

In a case in which the processes executed in steps S302 to S305 are provided on the basis of a system call or the like, the processes will be performed atomically. As a result, it is possible to prevent situations in which a plurality of programs write to the end of the file, thereby conflicting with each other and leading to the file becoming corrupt.

Operations of the Collection Program in the Server Device

Figure 4:
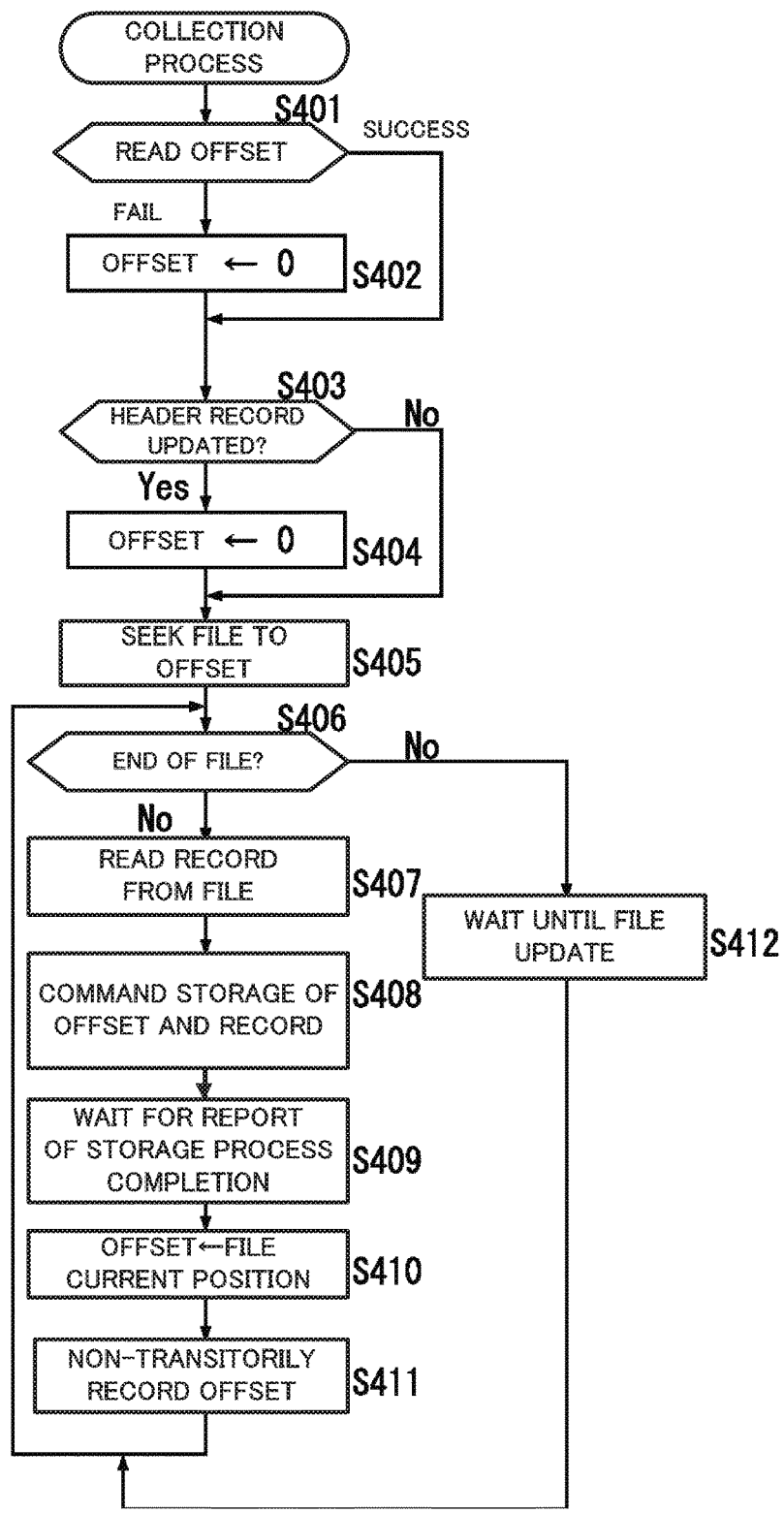
FIG. 4 is a flowchart illustrating the control of a collection process executed by the server device according to an embodiment of the present disclosure.

Hereinafter, the flow of the control of the collection program, which is executed in the server device 111, is described. FIG. 4 is a flowchart illustrating the control of the collection process executed by the server device according to an embodiment of the present disclosure. Hereinafter, the collection process is described while referencing FIG. 4. Note that the collection program and the aforementioned editing program are executed in parallel in the server device 111.

First, the server device 111 that has started the execution of the collection program attempts to read the offset associated with the file from the non-transitory information recording medium (step S401).

In cases in which the reading fails (step S401; FAIL), the server device 111 sets the offset to 0 (beginning of the file) (step S402), and then proceeds to the control of step S403.

In cases in which the reading is successful (step S401; SUCCESS), the server device 111 proceeds to the control of step S403.

Next, the server device 111 estimates whether the header records located between the beginning of the file and the acquired offset are updated (S403). One of the three techniques described above can be used for the estimating.

In cases in which it is estimated that an update has occurred (step S403; Yes), the server device 111 sets the offset to 0 (step S404), and then proceeds to the control of step S405.

In cases in which it is estimated that an update has not occurred (step S403; No), the server device 111 proceeds to the control of step S405.

Then, the server device 111 seeks the file to the set offset (step S405), and checks whether the end of the file has been reached (step S406).

In cases in which the end of the file has not been reached (step S406; No), the server device 111 reads the record from the file (step S407), and instructs the collection system 121 to associate and collect the read record with the offset (step S408). The server device 111 waits until a report, indicating that the record has been associated with the offset and stored, is received from the collection system 121 (step S409).

When the report regarding the offset is received, the server device 111 updates the offset to the current position of the file (step S410), records the updated offset in the non-transitory storage medium (step S411), and returns to the control of step S406. Note that, when a report is not received for a predetermined time and a timeout occurs, the collection system 121 may attempt to resend the record, or the server device 111 may return to the control of step S401 (not illustrated in the drawings).

In cases in which the end of the file is reached (step S406; Yes), the server device 111 waits until the size of the file changes (step S412), and returns to the control of step S406. Note that, in cases in which the wait time exceeds a predetermined threshold, instead of step S406, the server device 111 may return to the control of step S401 and re-check if the header records are modified.

In the present embodiment, the offset is updated and recorded each time the collection of the records by the collection program progresses. As such, in cases in which the processing deviates from the flow of the control described above such as the server device 111 being shut down or the execution of the collection program being forcibly ended, the records that have already been collected can be skipped after the server device 111 has restarted and the collection program has been re-executed. Additionally, the possibility of modifications to the records that have already been collected can be estimated in a short amount of time by sampling the header records. Accordingly, the server device 111 can quickly resume collecting.

Collection System

Hereinafter, the form of the collection system 121 is described while referencing FIG. 1.

As illustrated in FIG. 1, the collection system 121 includes one or a plurality of collection devices 122. In FIG. 1, an example of a collection system 121 including a plurality of collection devices 122 is illustrated, but a configuration is possible in which the collection system 121 includes one collection device 122. The receiving of commands by the collection system 121 from external devices is realized as a result of each of the collection devices 122 receiving commands, and each of the collection devices 122 appropriately returns a response to the received command to the corresponding external device.

Figure 5:
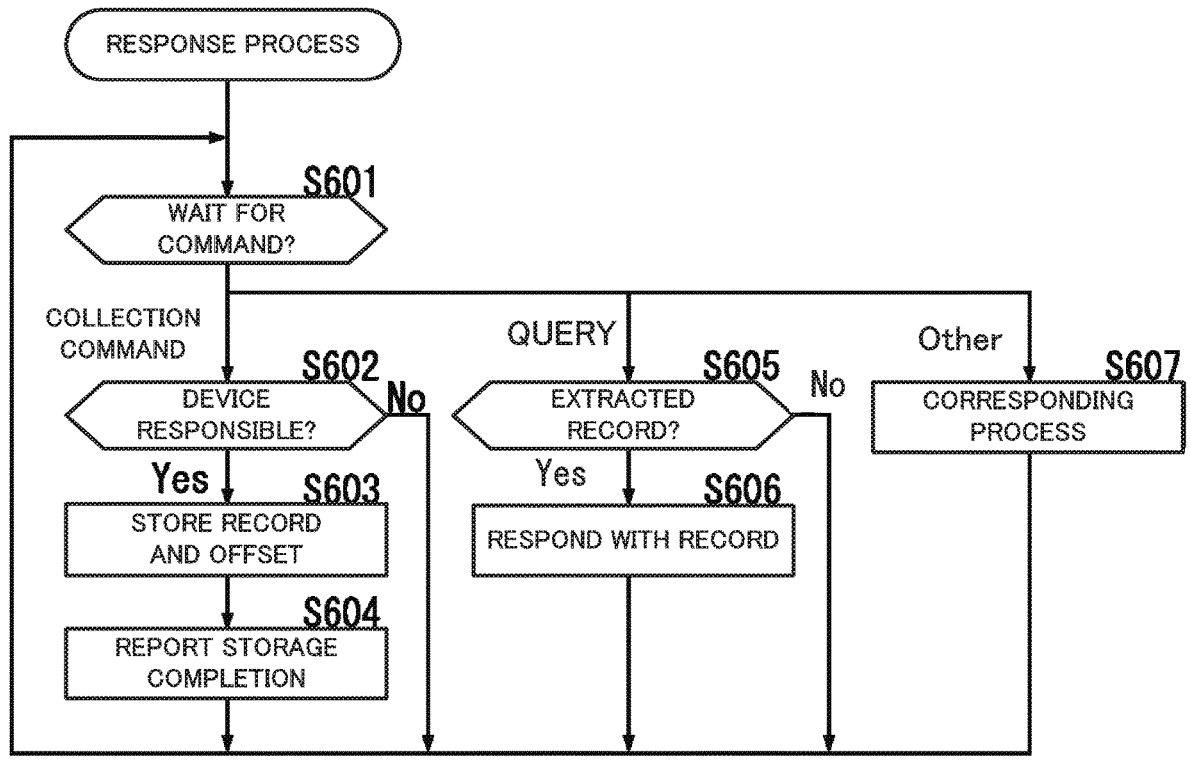
FIG. 5 is a flowchart illustrating the control of a response process executed by a collection device of a collection system according to an embodiment of the present disclosure.

Each of the collection devices 122 executes a response program to realize the collection system 121. FIG. 5 is a flowchart illustrating the control of a response process executed by the collection devices of the collection system according to an embodiment of the present disclosure. Hereinafter, the response process is described while referencing FIG. 5.

The collection device 122 that started the execution of the response program waits for a command to arrive from an external device (step S601).

In cases in which the command that arrives is a collection command from the server device 111 (step S601; Collect), the collection device 122 determines, on the basis of the offset stipulated in the collection command, whether the collection device 122 is responsible for storing (step S602).

Here, a case is considered in which N collection devices 122 are used. In this case, an administrator assigns a number to each of the collection devices 122. The numbers are unique and are 0, 1, 2, . . . , N−1. Each of the collection devices 122 determine that the collection device 122 is responsible for storing when the remainder of dividing the offset by N matches the number assigned to the collection device 122.

Note that, in cases in which the size of the records is constant, the remainder may be calculated by dividing the offset by the size and then dividing the result by N.

M collection devices 122 may be responsible for the storing of one record. For example, a configuration is possible in which it is determined that a collection device 122 is responsible for storing when the remainder obtained by adding the offset (or a value obtained by dividing the offset by the size of the fixed length record) to the number assigned to the collection device 122 and dividing the resulting value by N is one of 0, 1, . . . , M−1.

When it is determined that the collection device 122 is responsible for storing (step S602; Yes), the collection device 122 stores the record specified in the collection command in association with the offset specified in the collection command (step S603). Most simply, the offset can be used as the file name for storing the record. Additionally, a configuration is possible in which the content of the record is interpreted according to a predetermined format, and the resulting plurality of field values and offset are associated and stored in a database.

Then, the collection device 122 reports to the server device 111 that the record associated with the offset stipulated in the command is stored (step S604), and returns to the control of step S601.

In cases in which it is determined that the collection device 122 is not responsible for storing (step S602; No), the collection device 122 returns to the control of step S601.

In cases in which the command that arrives from the external device is a query from the client terminal 141 (step S601; Query), the collection device 122 extracts a record that satisfies the query from the records stored in the collection device 122.

Then, in cases in which there is an extracted record (step S605; Yes), the collection device 122 responds to the client terminal 141 with that record (step S606) and then returns to the control of step S601. In cases in which a record is not extracted (step S605; No), the collection device 122 returns to the control of step S601.

Note that the offset for the record may be included in the response with the extracted record. In such a case, when the client terminal 141 issues a query for acquiring all records, each of the collection devices 122 respond with the records and offsets thereof stored therein. The entire file in the server device 111 can be restored by the client terminal 141 arranging and concatenating the responded records in order of the offsets.

In cases in which the command is a different command (step S601; Other), the collection device 122 executes a corresponding process (step S607) and then returns to the control of step S601.

CONCLUSIONS

As described above, the file management system according to this embodiment includes a server device that non-transitorily stores a file and an offset for the file, and a collection system. In this file management system, (a) the server device executes an editing program, thereby functioning as an updater that updates the file by an editing process that includes an adding process that adds a record to the end of the file, (b) the server device executes a collection program, thereby functioning as a collector that reads, in order of location in the file, a record included in the file, causes the collection system to associate and collect the read record and a position where a beginning of the read record is located in the file, and updates the non-transitorily stored offset to a position where the end of the collected record is located in the file, and (c) the server device functions as an estimator that, when execution of the collection program is started, estimates whether any header records located between the beginning of the file and the non-transitorily stored offset are updated and, a starter that, when it is estimated that any of the header records are updated, causes the collector to start reading the record of the file from the beginning of the file, and when it is estimated that none of the header records are updated, causes the collector to start reading the record of the file from the non-transitorily stored offset.

In the file management system according to this embodiment, a configuration is possible in which:

the collector acquires an extraction position between the beginning of the file and the non-transitorily stored offset, reads data located at the extraction position acquired from the file, calculates a hash value of the read data, and non-transitorily stores the acquired extraction position and the calculated hash value, and the starter acquires the non-transitorily stored extraction position, reads the data located at the extraction position acquired from the file, and calculates a hash value of the read data and, when the calculated hash value is equivalent to the non-transitorily stored hash value, the estimator estimates that none of the header records are updated.

In the file management system, a configuration is possible in which the collector randomly determines the extraction position between the beginning of the file and the non-transitorily stored offset.

In the file management system, a configuration is possible in which the extraction position is randomly determined using random numbers having a probability distribution that attenuates from one of the non-transitorily stored offset and the beginning of the file to the other of the non-transitorily stored offset and the beginning of the file.

In the file management system according to this embodiment, a configuration is possible in which:

the collector acquires an extraction position uniquely associated with the non-transitorily stored offset, reads the data located at the extraction position acquired from the file, calculates a hash value of the read data, and non-transitorily stores the calculated hash value, and the starter acquires an extraction position that is uniquely associated with the non-transitorily stored offset, reads data located at the extraction position acquired from the file, and calculates a hash value of the read data and, when the calculated hash value is equivalent to the non-transitorily stored hash value, estimates that none of the header records are updated.

In the file management system according to this embodiment, a configuration is possible in which:

when a first record located at the beginning of the file is read by the collector and the first record is collected by the collection system, the collector calculates a hash value of the first record and non-transitorily stores the calculated hash value, and the starter calculates a hash value of the first record located at the beginning of the file and, in cases in which the calculated hash value is equivalent to the non-transitorily stored hash value, estimates that none of the header records are updated.

In the file management system according to this embodiment, a configuration is possible in which:

estimation by the estimator is performed periodically or intermittently after the execution of the collection program is started, and when, as a result of the periodically or intermittently performed estimation, it is estimated that any of the header records are updated, the collector reads the record of the file again from the beginning of the file.

In the file management system according to this embodiment, a configuration is possible in which the file is restored by concatenating, in an order of the positions associated with the collected records, the records collected by the collection system.

In the file management system according to this embodiment, a configuration is possible in which:

the collection system includes a plurality of collection devices, each of the records collected by the collection system is stored in one of the plurality of collection devices, together with a position associated with each of the records, and when the collection system receives a query from a client terminal, each of the plurality of collection devices extracts a record satisfying the query from among the records stored therein, and responds to the client terminal with the extracted record.

The file management method according to this embodiment is executed by a server device that non-transitorily stores a file and an offset for the file, and a collection system, the method comprising:

(a) the server device executing an editing program, thereby updating the file by an editing process that includes an adding process that adds a record to an end of the file;

(b) the server device executing a collection program, thereby reading, in order located in the file, a record included in the file, causing the collection system to associate and collect the read record and a position where a beginning of the read record is located in the file, and updating the non-transitorily stored offset to a position where the end of the collected record is located in the file; and (c) when the execution of the collection program is started, the server device estimating whether any header records located between the beginning of the file and the non-transitorily stored offset are updated and, when it is estimated that any of the header records are updated, starting reading the record of the file from the beginning of the file, and when it is estimated that none of the header records are updated, starting reading the record of the file from the non-transitorily stored offset.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

According to the present disclosure, a file management system can be provided in which a server device, which performs an adding process that adds a record to an end of a file, causes a collection device to collect the records included in the file. This file management system is suited to suppress the calculation load of the server device and the communication load between the server device and the collection device. Additionally, a file management method, a collection program for realizing the server device using a computer, and a non-transitory computer-readable information recording medium on which the collection program is recorded can be provided.

The invention claimed is:

1. A file management system, comprising:
a server device that non-transitorily stores a file and an offset for the file; and
a collection system, wherein
(a) the server device executes an editing program, thereby functioning as an updater that updates the file by an editing process that includes an adding process that adds a record to an end of the file,
(b) the server device executes a collection program, thereby functioning as a collector that, in a first execution of the collection program, reads, in order of location in the file, a record included in the file, causes the collection system to associate and collect the read record and a position where a beginning of the read record is located in the file, and updates the non-transitorily stored offset to a position where an end of the collected record is located in the file, and (c) the server device functions as
an estimator that, based on a second execution, subsequent to the first execution, of the collection program being started, estimates whether any header records located between a beginning of the file and the non-transitorily stored offset are updated, and
a starter that, in the second execution of the collection program, based on an estimation that any of the header records are updated, causes the collector to start reading the record of the file from the beginning of the file, and based on an estimation that none of the header records are updated, causes the collector to start reading the record of the file from the non-transitorily stored offset and to skip reading the record from the beginning of the file to the non-transitorily stored offset.

2. The file management system according to claim 1, wherein
the collector acquires an extraction position between the beginning of the file and the non-transitorily stored offset, reads data located at the extraction position acquired from the file, calculates a hash value of the read data, and non-transitorily stores the acquired extraction position and the calculated hash value, and
the starter acquires the non-transitorily stored extraction position, reads the data located at the extraction position acquired from the file, and calculates the hash value of the read data and, based on the calculated hash value being equivalent to the non-transitorily stored hash value, the estimator estimates that none of the header records are updated.

3. The file management system according to claim 2, wherein the collector randomly determines the extraction position between the beginning of the file and the non-transitorily stored offset.

4. The file management system according to claim 3, wherein the extraction position is randomly determined using random numbers having a probability distribution that attenuates from one of the non-transitorily stored offset and the beginning of the file to the other of the non-transitorily stored offset and the beginning of the file.

5. The file management system according to claim 1, wherein
the collector acquires an extraction position uniquely associated with the non-transitorily stored offset, reads data located at the extraction position acquired from the file, calculates a hash value of the read data, and non-transitorily stores the calculated hash value, and
the starter acquires the extraction position uniquely associated with the non-transitorily stored offset, reads the data located at the extraction position acquired from the file, and calculates a hash value of the read data and, based on the calculated hash value is being equivalent to the non-transitorily stored hash value, the estimator estimates that none of the header records are updated.

6. The file management system according to claim 1, wherein
when a first record located at the beginning of the file is read by the collector and the first record is collected by the collection system, the collector calculates a hash value of the first record and non-transitorily stores the calculated hash value, and
the starter calculates a hash value of the first record located at the beginning of the file and, in cases in which the calculated hash value is equivalent to the non-transitorily stored hash value, estimates that none of the header records are updated.

7. The file management system according to claim 1, wherein an estimation by the estimator is performed periodically or intermittently after the first execution of the collection program is started, and in cases in which, as a result of the periodically or the intermittently performed estimation, it is estimated that any of the header records are updated, the collector reads the record of the file again from the beginning of the file.

8. The file management system according to claim 1, wherein the file is restored by concatenating, in an order of the positions associated with the collected records, the records collected by the collection system.

9. The file management system according to claim 1, wherein the collection system includes a plurality of collection devices, each of the records collected by the collection system is stored in one of the plurality of collection devices, together with a position associated with each of the records, and when the collection system receives a query from a client terminal, each of the plurality of collection devices extracts a record satisfying the query from among the records stored therein, and responds to the client terminal with the extracted record.

10. A file management method executed by a server device that non-transitorily stores a file and an offset for the file, and a collection system, the method comprising:

(a) the server device executing an editing program, thereby updating the file by an editing process that includes an adding process that adds a record to an end of the file;

(b) the server device executing a collection program, thereby, in a first execution of the collection program, reading, in order of location in the file, a record included in the file, causing the collection system to associate and collect the read record and a position where a beginning of the read record is located in the file, and updating the non-transitorily stored offset to a position where an end of the collected record is located in the file; and (c) based on a second execution, subsequent to the first execution, of the collection program being started, the server device estimating whether any header records located between a beginning of the file and the non-transitorily stored offset are updated and, in the second execution of the collection program, based on an estimation that any of the header records are updated, starting reading the record of the file from the beginning of the file, and based on an estimation that none of the header records are updated, starting reading the record of the file from the non-transitorily stored offset and skipping reading the record from the beginning of the file to the non-transitorily stored offset.

11. A non-transitory computer-readable information recording medium on which a collection program is stored, the collection program being executable by a server device in a file management system, the file management system comprising the server device that non-transitorily stores a file and an offset for the file, and a collection system, wherein the collection program executed by the server device causes the server device to:

function as a collector that, in a first execution of the collection program, reads, in order of location in the file, a record included in the file, causes the collection system to associate and collect the read record and a position where a beginning of the read record is located in the file, and updates the non-transitorily stored offset to a position where an end of the collected record is located in the file;

function as an estimator that, based on a second execution, subsequent to the first execution, of the collection program being started, estimates whether any header records located between a beginning of the file and the non-transitorily stored offset are updated; and function as a starter that, in the second execution of the collection program, based on an estimation that any of the header records are updated, causes the collector to start reading the record of the file from the beginning of the file, and based on an estimation that none of the header records are updated, causes the collector to start reading the record of the file from the non-transitorily stored offset and to skip reading the record from the beginning of the file to the non-transitorily stored offset.

* * * * *